United States Patent
Tsai et al.

(10) Patent No.: US 10,315,487 B2
(45) Date of Patent: Jun. 11, 2019

(54) SOLID-STATE COOLING ADD-ON BAR UNIT FOR AIRCRAFT FOOD SERVICE APPARATUS

(71) Applicant: B/E AEROSPACE, INC., Wellington, FL (US)

(72) Inventors: Hsin-I Tsai, Buckinghamshire (GB); Peter John Leslie Burd, Carmarthenshire (GB); Richard Henry Jolley, Buckinghamshire (GB)

(73) Assignee: B/E Aerospace, Inc., Winston Salem, NC (US)

(*) Notice: Subject to any disclaimer, the term of this patent is extended or adjusted under 35 U.S.C. 154(b) by 257 days.

(21) Appl. No.: 15/474,781

(22) Filed: Mar. 30, 2017

(65) Prior Publication Data

US 2017/0282679 A1    Oct. 5, 2017

Related U.S. Application Data

(60) Provisional application No. 62/316,042, filed on Mar. 31, 2016.

(51) Int. Cl.
| | |
|---|---|
| *B60H 1/00* | (2006.01) |
| *B64D 13/08* | (2006.01) |
| *F25B 21/04* | (2006.01) |
| *B60H 1/22* | (2006.01) |
| *F25B 21/02* | (2006.01) |
| *B64D 11/04* | (2006.01) |

(52) U.S. Cl.
CPC ....... *B60H 1/00478* (2013.01); *B60H 1/2225* (2013.01); *B64D 13/08* (2013.01); *F25B 21/02* (2013.01); *F25B 21/04* (2013.01); *B64D 11/04* (2013.01); *F25B 2321/0251* (2013.01)

(58) Field of Classification Search
CPC ... B60H 1/00478; B60H 1/2225; F25B 21/02; F25B 21/04; F25B 2321/0251; B64D 13/08; B64D 11/04
See application file for complete search history.

(56) References Cited

U.S. PATENT DOCUMENTS

| | | | |
|---|---|---|---|
| 2,973,627 A | 3/1961 | Lackey et al. | |
| 6,344,630 B1* | 2/2002 | Jarvis | A47J 39/006 219/386 |
| 8,978,392 B2 | 3/2015 | Blackway et al. | |
| 2003/0117760 A1* | 6/2003 | Meir | G06F 1/20 361/103 |
| 2006/0288709 A1* | 12/2006 | Reidy | B01D 5/0042 62/3.4 |
| 2012/0025679 A1 | 2/2012 | Roering | |
| 2014/0123683 A1 | 5/2014 | Hou et al. | |

OTHER PUBLICATIONS

International Search Report for International Application No. PCT/US2017/025115 (8 pgs.) dated Jun. 9, 2017.

* cited by examiner

*Primary Examiner* — Ana M Vazquez
(74) *Attorney, Agent, or Firm* — Donna P. Suchy

(57) ABSTRACT

A solid-state cooling apparatus for a galley installed in an aircraft that includes at least one storage enclosure for containing chilled beverage and/or foods for storage and a solid-state air-to-air thermoelectric device having a hot side and a cold side mounted in the galley and having at least one fan for circulating chilled air in proximity to the storage enclosure. A waste heat capture device is provided and includes a hot air outlet for discharging waste heat from the hot side of the cooling thermoelectric devices into the aircraft exterior to the galley.

8 Claims, 4 Drawing Sheets

SOLID-STATE COOLING ADD-ON BAR UNIT FOR AIRCRAFT FOOD SERVICE APPARATUS

CROSS-REFERENCE TO RELATED APPLICATION

This application claims priority from U.S. Provisional Patent Application No. 62/316,042, filed Mar. 31, 2016, the contents of which are incorporated into this utility application in full.

TECHNICAL FIELD AND BACKGROUND OF THE INVENTION

This application relates to solid-state cooling apparatuses for use in connection with add-on bar units for aircraft galleys and similar monuments. The invention utilizes a commercially-available thermoelectric device (TED) also known as a thermoelectric cooler (TECs), to provide the basis of specific and unique methods of cooling beverages and other food in the form of fully integrated galley line replaceable units (LRU). These certification requirements are less stringent than the requirements applied to Galley Insert Equipment (GAINS).

The thermoelectric effect is the direct conversion of temperature differences to electric voltage and vice versa. A thermoelectric device creates voltage when there is a different temperature on each side. Conversely, when a voltage is applied to it, it creates a temperature difference. At the atomic scale, an applied temperature gradient causes charge carriers in the material to diffuse from the hot side to the cold side. This effect can be used to generate electricity, measure temperature or change the temperature of objects. Because the direction of heating and cooling is determined by the polarity of the applied voltage, thermoelectric devices can be used as temperature controllers.

The TED can be manufactured using hot and cold side finned (air-to-air) or fin and tank (air-to-liquid) heat sinks on either side of a thermoelectric module (TEM). The TEM is formed of P and T type semiconductors sandwiched between inner conductive plates and outer ceramic plates.

The invention utilizes the advantages of TED technology to provide unique compact cooling solutions that are integrated into the food service apparatus structure.

SUMMARY OF THE INVENTION

It is therefore an object of the invention to provide a functional integration of TEDs into the food service apparatus structure, allowing them to be certified as part of the food service apparatus systems for airworthiness certification purposes, as opposed to the more stringent requirements applied to externally manufactured, and supplied GAINS.

It is another object of the invention to provide integration of a TED into the food service apparatus structure in a manner that significantly reduces the size, cost and weight and complexity of a chiller installation, which reduces maintenance costs and mean time between failures (MTBF) of the LRU and makes replacement very quick and easy.

It is another object of the invention to provide integration of a TED into the food service apparatus structure in a manner that eliminates the use of environmentally-unfriendly gases and/or fluids in the manufacture and operation of the existing vapor cycle and chilled liquid food service apparatus coolers.

These and other objects and advantages of the present invention are achieved in the preferred embodiment disclosed below by providing an integrated line replaceable unit solid-state cooling apparatus that includes at least one chiller storage enclosure with semi-enclosed reversed recirculated cooling and vertically mounted air-to-air thermoelectric devices having a hot side and a cold side. At least one chiller with a fully enclosed recirculated cooling device is provided together with a horizontally mounted air-to-air thermoelectric device having a hot side and a cold side. A waste heat capture device is provided, including a hot air outlet for discharging the waste heat from the hot side of the cooling thermoelectric devices into a surrounding environment. This waste heat can be used as supplemental heat in, for example, an aircraft cabin.

According to another embodiment of the invention, a solid-state cooling apparatus for a galley installed in an aircraft that includes at least one storage enclosure for containing chilled beverage and/or foods for storage and a solid-state air-to-air thermoelectric device having a hot side and a cold side mounted in the galley and having at least one fan for circulating chilled air in proximity to the storage enclosure. A waste heat capture device is provided and includes a hot air outlet for discharging waste heat from the hot side of the cooling thermoelectric devices into the aircraft exterior to the galley.

According to another embodiment of the invention, the thermoelectric device is a semi-enclosed reversed recirculated cooling device.

According to another embodiment of the invention, the thermoelectric device is a fully enclosed recirculated cooling device.

According to another embodiment of the invention, the thermoelectric device is an open, non-recirculating cascade-cooling device.

According to another embodiment of the invention, the galley includes a warming compartment for warming food items, and the thermoelectric device discharges waste heat from the hot side into the warming compartment.

According to another embodiment of the invention, the solid-state cooling apparatus includes a plurality of thermoelectric devices positioned in a vertical stack in the galley and adapted to discharge chilled air for downward flow through the galley from a top of the galley to a bottom of the galley.

According to another embodiment of the invention, the solid-state cooling apparatus includes a plurality of thermoelectric devices positioned in a vertical stack in the galley and adapted to discharge chilled air for downward flow through the galley from a top of the galley to a bottom of the galley.

According to another embodiment of the invention, a solid-state cooling apparatus for a food service apparatus installed in an aircraft is provided, and includes at least one open beverage/food shelf positioned in the food service apparatus and a cold air cascade thermoelectric device having a cold side and a hot side positioned in a top portion of the food service apparatus above the at least one open beverage/food shelf for providing downwardly cascading, non-recirculating chilled air to the at least one open beverage/food shelf. An ice bucket/bottle chiller is positioned below the beverage/food shelf for receiving scavenged chilled air from the beverage/food shelf. A fully enclosed recirculated thermoelectric device having a cold side and a hot side is provided for circulating chilled air to the ice bucket/bottle chiller. At least one sliding beverage drawer is positioned below the ice bucket/bottle chiller for receiving scavenged air from the beverage/food shelf and the ice bucket/bottle chiller, and a semi-enclosed reversed recirculated cooling thermoelectric device is provided, having a cold side and a hot side for circulating chilled air within the beverage drawer. A food warming compartment is positioned in the food service apparatus above the thermoelectric device circulating chilled air to the ice bucket/bottle chiller in air flow communication with the hot side for receiving exhaust air from the hot side to warm the food contents of the warming compartment. At least one warm air outlet is provided for exhausting warm air from the hot side of the sliding beverage drawer thermoelectric device.

According to another embodiment of the invention, first and second sliding beverage drawers are positioned in the food service apparatus and are furnished with chilled air by respective first and second semi-enclosed reversed recirculated cooling thermoelectric devices.

According to another embodiment of the invention, the first and second semi-enclosed reversed recirculated cooling thermoelectric devices exhaust warm air from a respective hot side to a warm air outlet to the aircraft cabin.

According to another embodiment of the invention, the first and second sliding beverage drawers are furnished with air scavenged from the thermoelectric device of the open beverage/food shelf.

According to another embodiment of the invention, first, second and third open shelves are positioned in the food service apparatus.

According to another embodiment of the invention, the then isoelectric devices include two stage cooling wherein ambient supply air of a secondary hot side is precooled by an integrated primary cooling stage.

According to another embodiment of the invention, the food service apparatus comprises a galley.

According to another embodiment of the invention, the thermoelectric device includes a heat sink fabricated of graphene.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT AND BEST MODE

Figure 1:
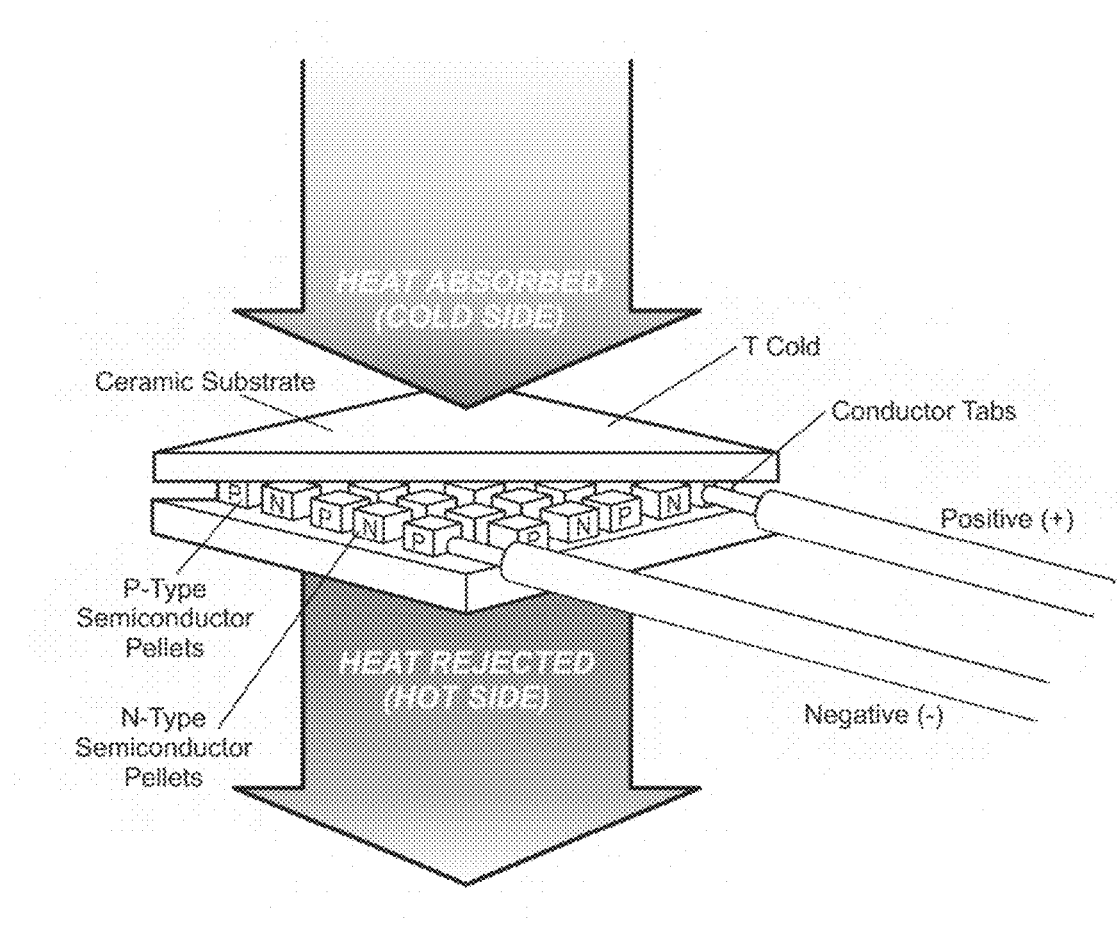
FIG. 1 is a schematic representation of the operation of a typical TED.
Figure 2:
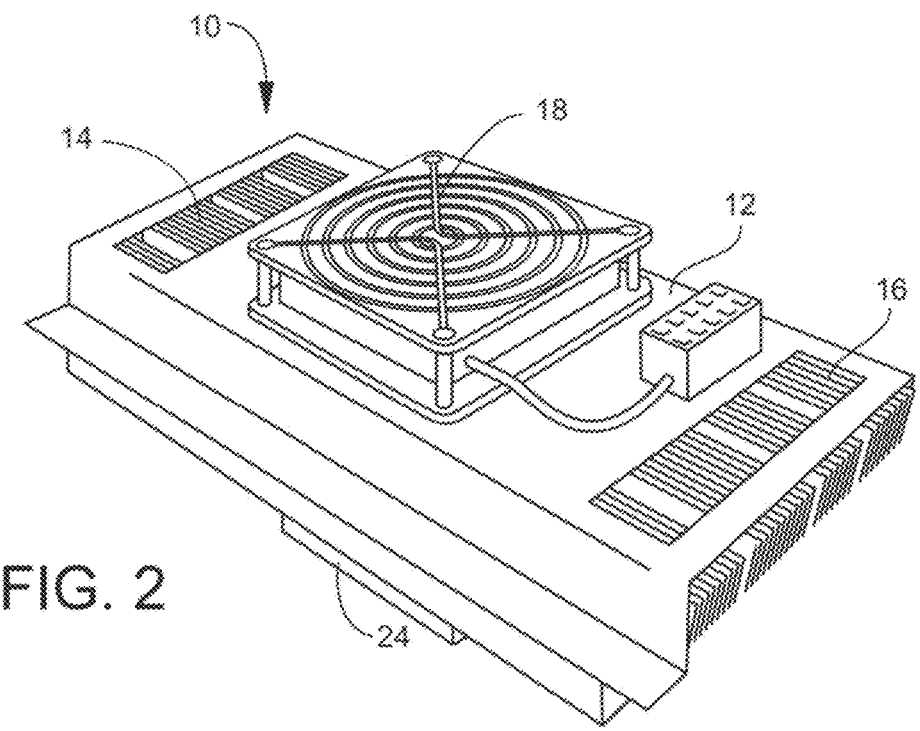
FIG. 2 is a representation of the cold side of a typical thermoelectric device.
Figure 3:
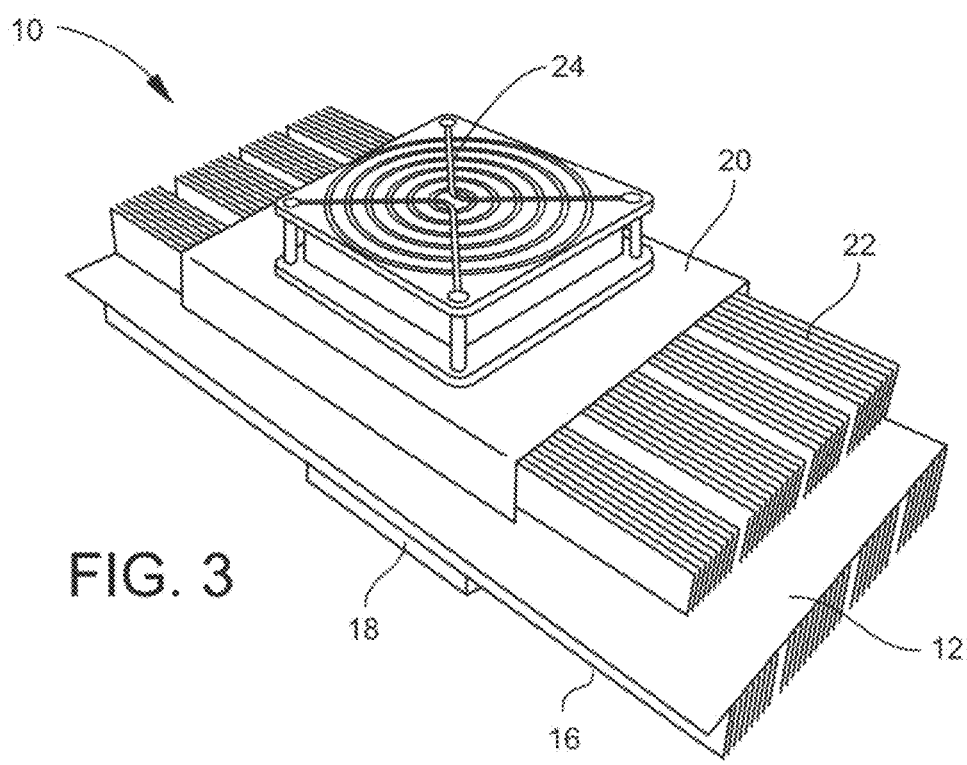
FIG. 3 is a representation of the hot side of a typical thermoelectric device (TED)

FIGS. 1, 2 and 3 illustrate the basic principles of operation of a typical TED, which are well understood by those of skill in the relevant technology area.

FIG. 1 illustrates a TEM apparatus, which operates on the principle of passing an electric current between the semiconductors to create a differential temperature between one side of the module and the other side. By cooling the hot side of the module (rejected heat), the temperature on the cold side is further reduced (absorbed heat). In air-to-air configurations, a finned aluminum, graphite or other material heat sink is used to dissipate the heat. Circulating air through the finned cold side heat sink allows a chilled airflow to be produced, which can be recirculated within a closed compartment or used as a cold air cascade with no recirculation.

To cool the hot side, ambient air is used. The heated air is commonly regarded as waste.

As an alternative to using air to cool the hot side, a suitable liquid may be used.

As is shown in FIGS. 2 and 3, a typical TED 10 is shown, and includes a shroud 12 covering finned heat sinks 14 and 16 on the hot side. An axial cooling fan 18 pulls air through the TED 10. The cold side includes a partial shroud 20 that partially covers a finned heat sink 22. An axial recirculation/cascade fan 24 expels cold air from the TED 10 for cooling.

These principles are put to efficient and effective use in the environment of an aircraft galley in the present invention, which is illustrated according to several applications in FIGS. 4-7.

Figure 4:
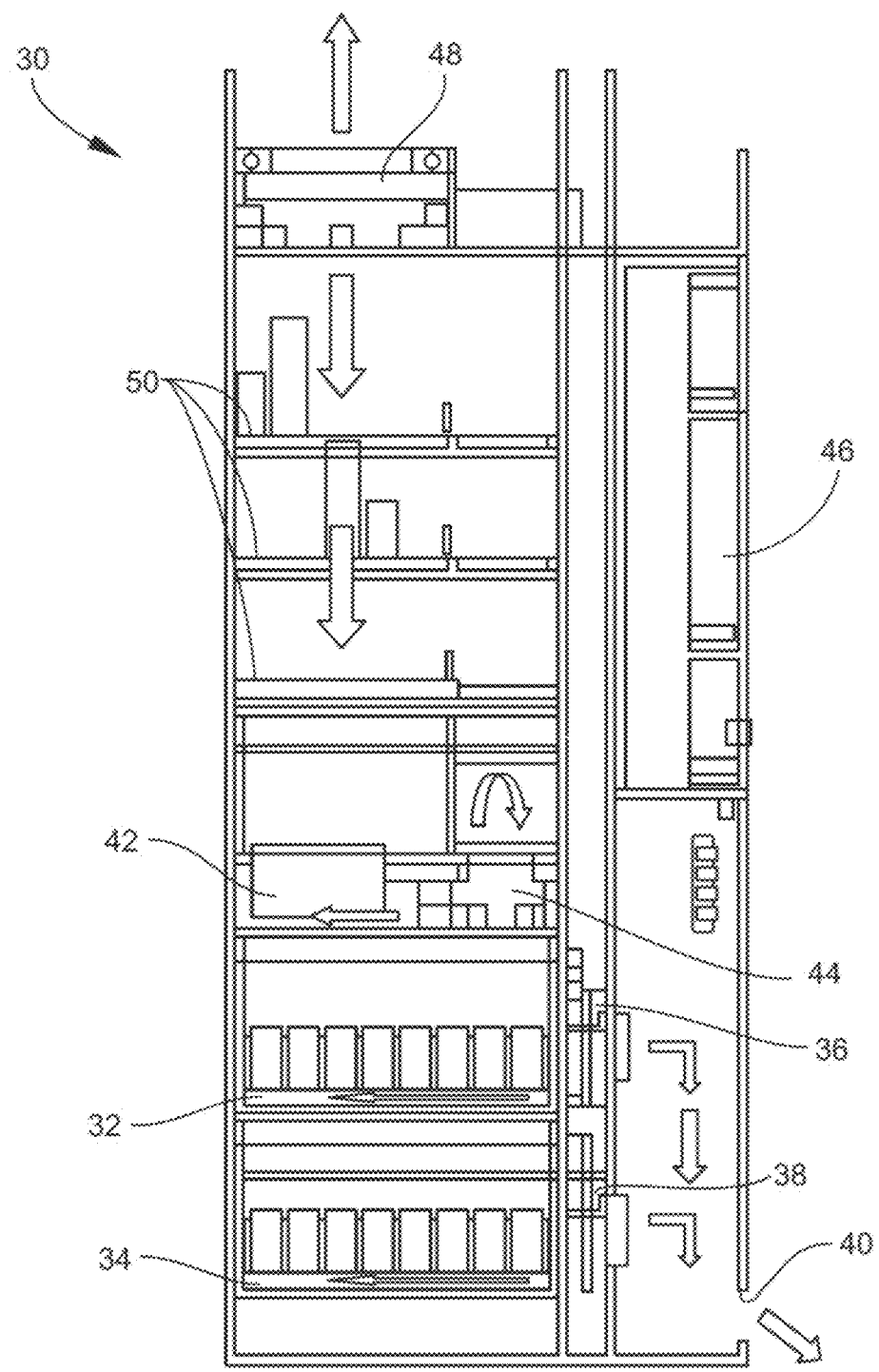
FIG. 4 is a vertical cross-section through a galley add-on bar unit in accordance with an embodiment of the invention.
Figure 5:
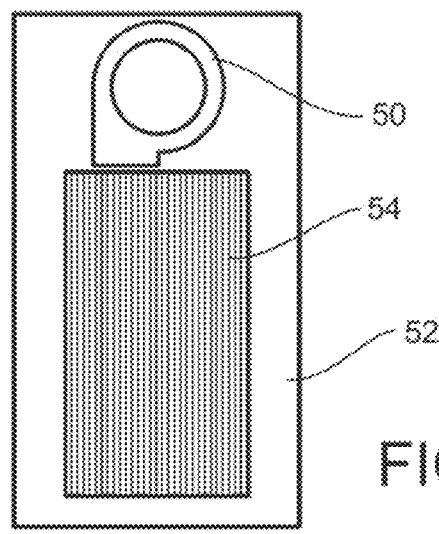
FIG. 5 is a layout of the cold side of the line replaceable unit in the form of a sliding drawer for holding chilled beverage cans and the like according to an embodiment of the invention.
Figure 6:
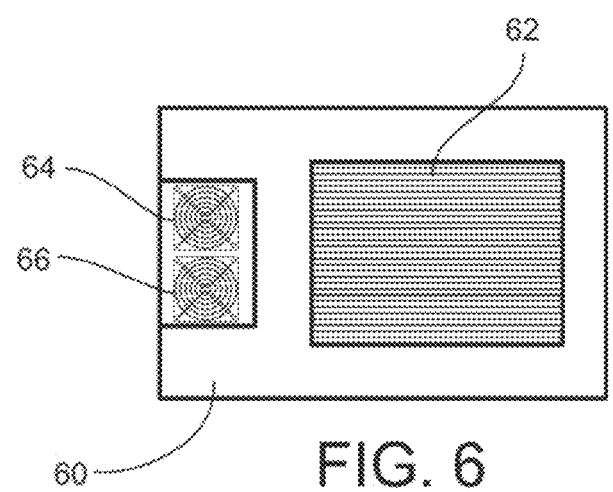
FIG. 6 is a layout of the cold side of the line replaceable unit in the form of an enclosed ice bucket or bottle chiller and the like according to an embodiment of the invention.

FIG. 4 illustrates a galley add-on bar unit 30 that is adapted to be inserted as a module in an aircraft galley monument (not shown). The bar unit 30 includes sliding drawers 32, 34 for holding drink cans or similar products. The drawers 32, 34 are cooled with semi-enclosed reversed recirculated cooling and vertically mounted air-to-air TEDs 36, 38. Waste heat expelled from the TEDs 36, 38 is used for cabin warming through a hot air outlet 40 that discharges the waste heat from the hot side of the TEDs 36, 38 that cool the sliding drawers 32, 34.

An ice bucket/bottle chiller 42 with a fully enclosed recirculated cooling and horizontally mounted air-to-air TED 44 is mounted in the bar unit 30. A semi-enclosed warming compartment 46 is heated using the waste heat from the ice bucket/bottle chiller 42.

A cold air cascade TED unit 48 with no recirculation and open cooled shelves 50 uses either an air-to-air or liquid-to-air hot to cold side. The cold air from the TED 48 is thus permitted to cascade downward through the open cooled shelves 50, cooling the items stored on the shelves 48. Hot exhaust is vented upwardly away from the bar unit 30 and can also be used to provide warm air for the aircraft cabin.

Despite their functional integration, the TEDs remain a line replaceable unit (LRU) for maintenance, repair and replacement purposes. The chilled air produced by the thermoelectric cycle can be used in a fully enclosed or semi-enclosed compartment where the air is recirculated or as a cascade where the cooled air is not recirculated, as referenced above. As described above, the galley-integrated compartment LRU can take the form of a sliding drawer with an opening lid where chilled air is introduced underneath a perforated shelf supporting drink cans. Recirculated air can be scavenged and returned by a scroll fan 50 across a hot/cold divider plate 52 and a finned heat sink 54, and this chilled air circulation is regarded as semi-sealed. See FIG. 5.

The ice bucket/bottle chiller 42 is cooled by air circulated around an inset container. The ice and/or bottles can be placed, replaced or refreshed in the container without disrupting the recirculated cold air. Air is passed across a hot/cold divider plate 60 and a finned heat sink 62 by two axial fans 64, 66. The chilled air circulation is therefore considered sealed. See FIG. 6.

Figure 7:
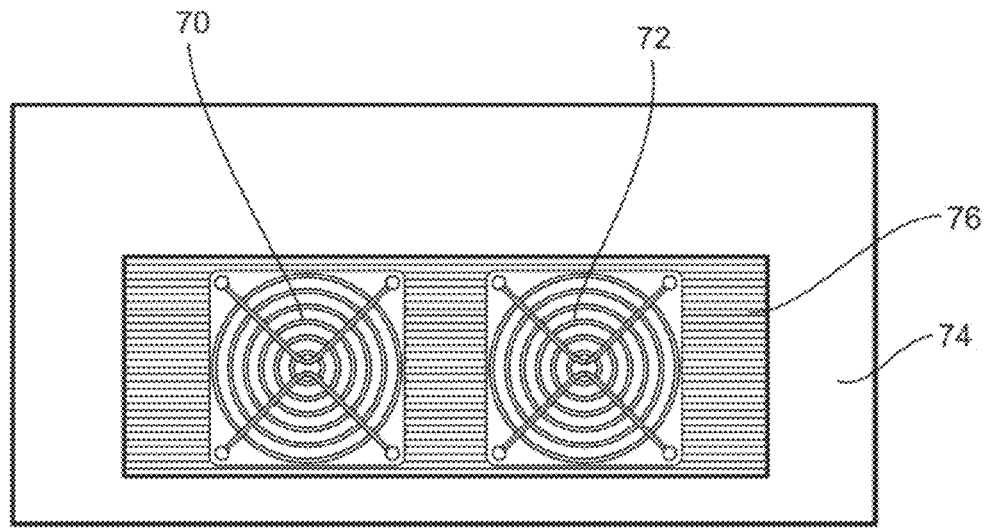
FIG. 7 is a layout of a cold air cascade in the form of a ducted chilled airflow supplying horizontal shelves for housing beverage cans according to an embodiment of the invention.

As shown in FIG. 7, a cold air cascade such as used to chill the open shelves 50 takes the form of a ducted, chilled airflow. The chilled airflow is not recirculated and vents to atmosphere. Axial fans 70, 72 circulate air across a hot/cold side divider plate 74 and a finned heat sink 76.

The finned heat sinks and air-to-air TED can be manufactured from graphene to significantly improve thermal conductivity by a factor of 25 and also reduce weight. The TEDs can use DC or AC electric fans to provide cold side air distribution and hot side cooling. These can take the form of axial, tube axial and scroll blower type fans.

The divider panel between the hot and cold side of a TED can be made from an insulation value panel such as fiberglass, skinned foam core panel, encapsulated Vacuum Insulation Panel (VIP) or a honeycomb core fiberglass panel treated with thermal resistant paint. In certain TED designs, the hot side heat sink can be cooled by the aircraft's cabin air extraction system, in place of electric fans.

Where practical, the TED hot side finned heat sink can be replaced with a liquid heat exchanger. The liquid can either be supplied by the aircraft from an existing chilled liquid loop system, or connected to a localized system using incorporating a liquid to air heat exchanger with forced air-cooling.

The TEM can be provided with a two-stage cooling system where the ambient supply air of the secondary stage hot side is pre-cooled by an integrated primary stage. This allows a greater temperature delta to be achieved between the secondary stage hot and cold sides. With higher cooling capacity, two stage TEDs, larger compartments such as Meal Box (Standard Units) storage and Meal Carts (Trolleys) bays can be chilled. Where appropriate, the finned cold side heat sink of a TED can be replaced with a direct contact conduction plate, which can be used to chill individual items or specific areas instead of using a circulated airflow.

The chilling of galley components using circulated chilled liquid (via an aircraft based system) or vapor cycle air chiller is known technology, as are the principles of thermoelectric cooling. However, the functional integration of solid-state cooling into a galley structure, as an LRU is not.

Unique aspects of the designs such as the use of the hot exhaust for secondary heating purposes, two-stage cooling, graphene heat sinks, VIP-based hot/cold side dividers and enclosed, semi-closed and open loop chilling applications are also novel.

The invention significantly reduces the size, cost and weight and complexity of a chiller installation, reduces maintenance costs and MTBF of the LRU, and makes replacement very quick and easy. TEDs also eliminate the use of environmentally unfriendly gases and/or fluids in the manufacture and operation of the existing vapor cycle and chilled liquid galley coolers.

An integrated line replaceable unit solid-state cooling apparatus for use in connection with add-on bar units for aircraft galleys and similar monuments is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A solid-state cooling apparatus for a food service apparatus installed in an aircraft, comprising:
    (a) at least one open beverage/food shelf positioned in the food service apparatus;
    (b) a cold air cascade thermoelectric device having a cold side and a hot side positioned in a top portion of the food service apparatus above the at least one open beverage/food shelf for providing downwardly cascading, non-recirculating chilled air to the at least one open beverage/food shelf;
    (c) an ice bucket/bottle chiller positioned below the beverage/food shelf for receiving scavenged chilled air from the beverage/food shelf, and a fully-enclosed recirculated thermoelectric device having a cold side and a hot side for circulating chilled air to the ice bucket/bottle chiller;
    (d) at least one sliding beverage drawer positioned below the ice bucket/bottle chiller for receiving scavenged air from the beverage/food shelf and the ice bucket/bottle chiller, and a semi-enclosed reversed recirculated cooling thermoelectric device having a cold side and a hot side for circulating chilled air within the beverage drawer;
    (e) a food warming compartment positioned in the food service apparatus above the thermoelectric device circulating chilled air to the ice bucket/bottle chiller in air flow communication with the hot side for receiving exhaust air from the hot side to warm the food contents of the warming compartment; and
    (f) at least one warm air outlet for exhausting warm air from the hot side of the beverage/food shelf thermoelectric device or the sliding beverage drawer thermoelectric device.

2. A solid-state cooling apparatus according to claim 1, wherein first and second sliding beverage drawers are positioned in the food service apparatus are furnished with chilled air by respective first and second semi-enclosed reversed recirculated cooling thermoelectric devices.

3. A solid-state cooling apparatus according to claim 2, wherein the first and second semi-enclosed reversed recirculated cooling thermoelectric devices exhaust warm air from a respective hot side to a warm air outlet to an aircraft cabin.

4. A solid-state cooling apparatus according to claim 2, wherein the first and second sliding beverage drawers are furnished with air scavenged from the thermoelectric device of the open beverage/food shelf.

5. A solid-state cooling apparatus according to claim 1, including first, second and third open shelves positioned in the food service apparatus.

6. A solid-state cooling apparatus according to claim 1, wherein the thermoelectric devices include two stage cooling wherein ambient supply air of a secondary hot side is precooled by an integrated primary cooling stage.

7. A solid-state cooling apparatus according to claim 1, wherein the food service apparatus comprises a galley.

8. A solid-state cooling apparatus according to claim 1, wherein the cold air cascade thermoelectric device includes a heat sink fabricated of graphene.

* * * * *